United States Patent [19]

Toraason et al.

[11] Patent Number: 5,224,272
[45] Date of Patent: Jul. 6, 1993

[54] ROTARY RUNOUT MEASURING SYSTEM

[75] Inventors: Clifford M. Toraason, Cincinnati; Patrick M. Sullivan, Hamilton, both of Ohio

[73] Assignee: General Electric Company, Cincinnati, Ohio

[21] Appl. No.: 774,923

[22] Filed: Oct. 11, 1991

[51] Int. Cl.$^5$ ............................................. G01B 5/20
[52] U.S. Cl. .................................... 33/504; 33/1 PT; 33/550; 33/555
[58] Field of Search .............. 33/1 N, 1 PT, 504, 533, 33/534, 550, 554, 555

[56] References Cited

U.S. PATENT DOCUMENTS

| | | | |
|---|---|---|---|
| 2,723,461 | 11/1955 | Reason et al. | 33/550 |
| 2,775,755 | 12/1956 | Sink | 33/1 PT |
| 2,987,825 | 6/1961 | Torn et al. | 33/172 |
| 3,125,811 | 3/1964 | Pierce et al. | 33/550 |
| 3,234,655 | 2/1966 | Skeels et al. | 33/555 |
| 3,400,463 | 9/1968 | Barringer | 33/554 |
| 3,481,043 | 12/1969 | Esch | 33/174 |
| 3,755,907 | 9/1973 | Kreiensen et al. | 33/1 N |
| 3,918,816 | 11/1975 | Foster et al. | 356/167 |
| 4,050,293 | 9/1977 | Shimomura et al. | 73/105 |
| 4,070,762 | 1/1978 | Siddall | 33/174 |
| 4,141,149 | 2/1979 | George et al. | 33/533 |
| 4,622,756 | 11/1986 | Marsden | 33/556 |
| 4,766,374 | 8/1988 | Glass, III et al. | 324/207 |
| 4,775,947 | 10/1988 | Marron | 364/550 |
| 4,807,152 | 2/1989 | Lane et al. | 364/513 |
| 4,837,980 | 6/1989 | Rogers, Jr. | 51/165 |
| 4,907,447 | 3/1990 | Tanaka et al. | 73/146 |

FOREIGN PATENT DOCUMENTS

| | | | |
|---|---|---|---|
| 2000005 | 7/1971 | German Democratic Rep. | 33/550 |
| 2937673 | 4/1981 | German Democratic Rep. | 33/550 |
| 0003008 | 1/1982 | Japan | 33/1 PT |
| 1585665 | 8/1990 | U.S.S.R. | 33/534 |

Primary Examiner—Thomas B. Will
Attorney, Agent, or Firm—Jerome C. Squillaro; Charles L. Moore, Jr.

[57] ABSTRACT

A low cost, portable computer aided runout measuring system for cylindrical components comprises an electrically interconnected displacement transducer, a computer and an ancillary angle measuring device. Runout deviations are stored in the computer in a displacement vs. time mode while concurrently therewith the angle at deviation is stored in the computer.

14 Claims, 2 Drawing Sheets

ROTARY RUNOUT MEASURING SYSTEM

BACKGROUND OF THE INVENTION

This invention relates to a rotary runout measuring system and more specifically to a computer aided runout metrological apparatus and system particularly adaptable for measuring runout and flatness on rotating objects such as compressor and turbine rotors of aircraft gas turbine engines.

Aircraft gas turbine engines utilize a number of components of precise dimensions and tolerances which require comparable precise quality control and inspection to insure proper fit and operation. For rotating objects, measurement of true roundness, flatness, parallelism and the like, or variance therefrom, referred to as radial or face runout, is a usually necessary and often critical requirement. There are various devices for this purpose which generally utilize a probe element usually in trailering rolling contact with the rotating component and deflected by variances in cylindricity. The deflection is sensed by electrical or mechanical means to provide an electrical signal which is proportional to the deflection. Such systems lack the ability not only to acquire data of consistently high quality but also in a form which does not need to be transcribed into an electronic format for comparison and analysis. Other and more elaborate systems introduce undesirable complexities with attendant higher costs.

OBJECTS OF THE INVENTION

It is an object of this invention to provide an improved low cost easily portable electronic metrological measuring system.

It is another object of this invention to provide an improved computer aided electronic runout measuring system in which the measuring signal is obtained and stored in electronic format.

It is a further object of this invention to provide an improved and computer aided easily portable runout measuring system in which high quality data is rapidly obtained in electronic form which may be conveniently directly entered into an overall analysis program.

SUMMARY OF THE INVENTION

One form of the basic apparatus of this invention comprises a displacement transducer arranged to be displaced by a variance in roundness or the periphery of a component or object to provide a variance signal to a computer such as a personal computer, PC, of small size in which the variance signal is stored as displacement vs. time. Non-contacting or contacting angular position indicator means is incorporated in the apparatus.

This invention will be better understood when taken in connection with the following drawings and their description.

DESCRIPTION OF PREFERRED EMBODIMENTS

Figure 1:
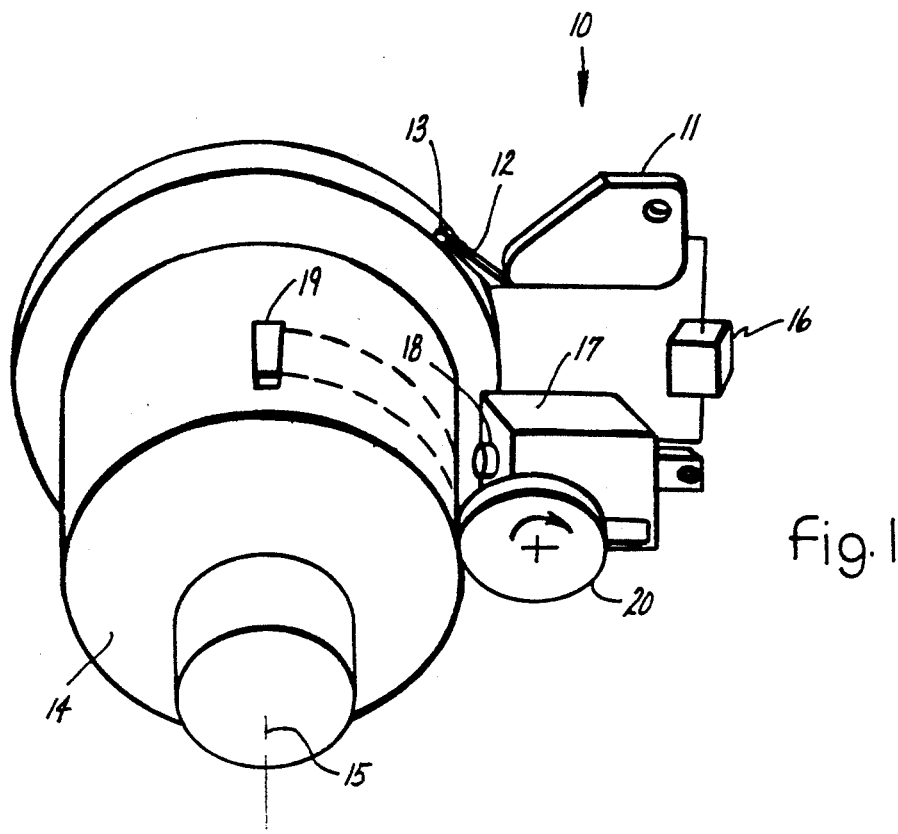
FIG. 1 is a schematic illustration of the basic interrelated devices comprising the measuring apparatus of this invention.

Referring now to FIG. 1, measuring assembly 10 comprises a transducer device 11 having a flexible arm 12 with a contact member thereon, for example, rolling element 13. Rolling element 13 is adapted to bear against a rotary component 14 where true circle circumference is to be measured for any irregularity. As component 14 is rotated about its central axis 15 which is its ordinary operational axis of rotation, any deviation in the circumference under rolling element 13 causes arm member 12 to flex or change its position. This change in position is employed to supply an electrical signal in the known manner, for electrical transducers, which is proportional to the extent of the change of position of arm member 12 and any deviation of the true circumference of component 14. The electrical signal from transducer 11 is passed to a commercially available computer 16 and stored therein as displacement vs. time.

The angular position of any deviation is identified by an ancillary and cooperative angle measuring device 17 positioned adjacent rotary component 14. Ancillary angle measuring device or unit 17 is, like the other components, small, easily portable and adjustable. An advantage of system 10 of this invention is its light weight small size components which permit easily portability to the test site and rapid assembly for tests. For example, the illustrated devices may be simple magnet supported units which are rapidly attached to test stands and fixtures as well as quickly disassembled for transport to another site. An exposed magnet pickup unit 18 on ancillary angle measuring device 17 projects adjacent the periphery of rotary component 14 at a position generally parallel to rolling element 13 of transducer 11. A small magnet 19 is suitably attached to the periphery of rotary component 14 in a manner to permit magnet 19 to pass by magnetic pickup 18 without contact. Preferably magnet 19 is positioned on rotary component 14 at a 0° or 12 o'clock position. A contact wheel 20 extends from device 17 to also engage the periphery of rotary component 14 for rotation and peripheral distance measurement of component 14. Wheel 20 is also connected to an internal encoder in angle device 17 which produces an electrical signal to computer 16 of a high number of counts per revolution of rotary component 14. In operation, magnet 19 passes by magnetic pickup 18 at the precise time transducer 11 is indicating the peripheral surface condition at the 12 o'clock or 0° location, at which magnet 19 is positioned. Also, at the instant of time when computer 16 is recording displacement vs. time on one channel, it is also recording counts on another channel. At the instant of time of passage of magnet 19 past pickup 18, the count is reset to 0 and the counts continue. The number of counts totalled in the interim until magnet 19 again passes pickup 18 is the number of counts per revolution of component 14. Accordingly computer 16 contains information of deviation of the circumference from true circle particularly with respect to angular location of the deviation from the defined 0° position. This information is present in an electronic format which may be duly processed in various electronic analyzing equipment.

Angular location of any deviation is an important measurement for subsequent corrective action. Another and a non-contact angular measurement system for use in this invention is illustrated and described with respect to FIG. 2.

Figure 2:
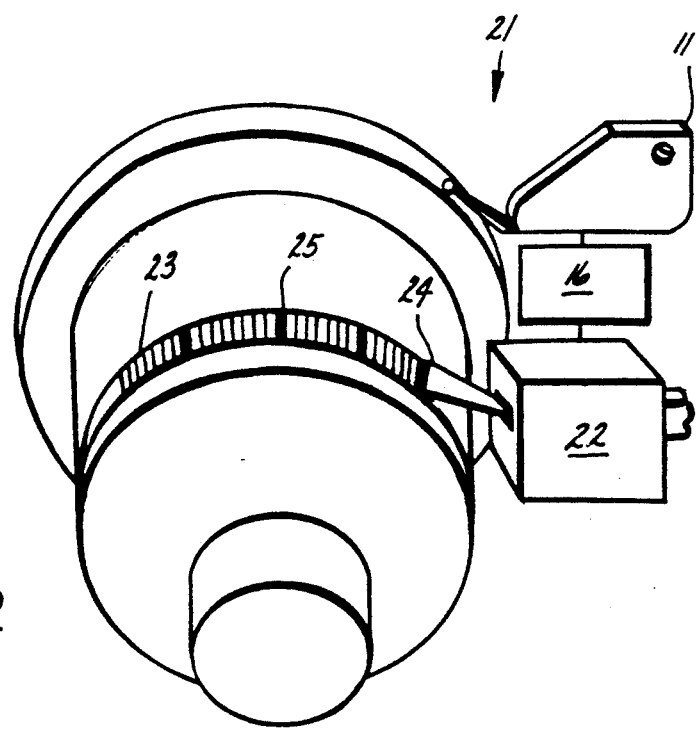
FIG. 2 is a schematic illustration of a laser scanner modification of FIG. 1.

Referring now to FIG. 2, measuring system 21 is generally similar to assembly 10 of FIG. 1 except that device 17 of FIG. 1 is replaced with an optical device such as, for example, a laser scanner 22 to avoid the use of a second contact member. A code band in the form of a flexible material tape 23 with a printed code thereon is attached to the circumference of the rotary component 14 so that tape 23 passes by a light beam 24 projecting from scanner 22. Code band or tape 23 may be a separate item such as a tape 23 affixed to component 14 or comprise appropriate indicia formed into the peripheral surface of component 14. Code band 23 of either modification includes a 0° or 12 o'clock marker 25 with equally graduated prior and subsequent marks, particularly for a series of hour marks peripherally from and returning to the 12 o'clock marker 25. The pattern of markings on code band 23 may be of the kind to provide counts, or the pattern may be bar coded to contain the number of the particular angle being scanned by laser beam 24. In this latter arrangement, the direction of rotation of component 14 is not meaningful to the operator of the system.

Figure 3:
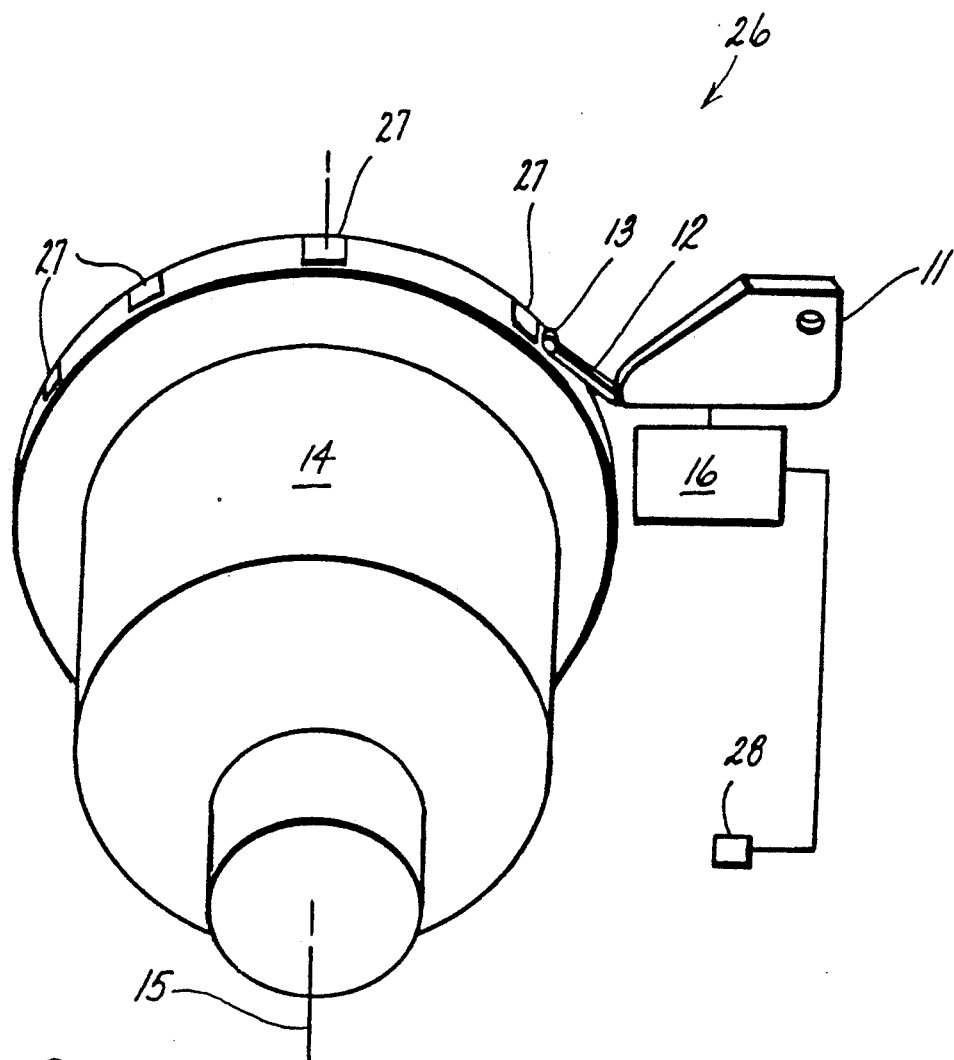
FIG. 3 is a schematic illustration of a modification of FIG. 1 which incorporates angle measurement without a separate angle measuring device.

A separate device for measuring angles may be excluded by a modification of the basic system of FIG. 1 as further illustrated in FIG. 3.

Referring now to FIG. 3, system 26 is quite similar to system 21 of FIG. 2 except that tape 23 is replaced with, in one example, a circular row of markers 27 of known width and thickness, for example, 12 magnetic markers placed at the clock hour positions around the circumference to be measured of component 14 and arranged to pass under rolling element 13 of transducer 11. Ordinarily, for tests of the kind described, component 14 is mounted so that a test operator may rotate it manually about its axis of rotation 15. In operation of this manual embodiment, an operator perceives, for example, that the 12 o'clock marker is approaching transducer 11, and at this point, presses a separate and manual electrical signal means 28 which is connected to computer 16 and supplies a signal to computer 16 that the 12 o'clock marker is approaching and the computer will so mark this event. The 12 o'clock marker is, in this case, the start position to begin a test. By counting the markers and noting the interval therebetween, the computer knows within a reasonable and satisfactory range of accuracy, the angle which correlates with the deviation information being received at that instant. By noting the time elapsing between the event markers 27 (FIG. 3), the computer calculates and displays the average angular velocity during that interval which, if not within the limits of predetermined angular velocity for best data, would provide an appropriate warning signal to the operator to repeat the procedure. Appropriate drive means and controls may be fitted so that the operator may control speed of rotation of component 14 particularly during the time allotted for taking data.

This invention provides a basic, simple, low cost contact and non-contact systems for measuring deviation from a true circle or circumference of a component whose roundness is required to be retained within precise tolerance limits.

This invention is broadly applicable and adaptable for measuring roundness, flatness, eccentricity, etc. of various components or objects. A salient feature of the assemblies of FIGS. 1-3 is their utilization of simple components of a small size as compared to what is known as desk-top or bench models. This size, in combination with the non-special nature of the known components permits the components to be individually added or removed from a test site and transported individually or loosely enclosed in a single small parcel for transfer to and from testing sites. A particular advantage of this invention is that it provides the kind of information usually associated with complex, high cost, fixed, testing apparatus, in a small portable system. Moreover, this invention is directly applicable to components in their manufacturing area or "on the shop floor."

While this invention has been disclosed and described with respect to preferred embodiments, it will be understood by those skilled in the art that various changes and modifications may be made without departing from the spirit and scope of the invention in the following claims.

What is claimed is:

1. A measuring system for measuring cylindricity of a rotary component mounted for rotation about its axis of rotation comprising in combination
   (a) a displacement transducer having a contact element thereon in contact with a circumference of said component to be measured,
   (b) a computer connected to said transducer to receive electrical deviation signals therefrom when said contact element traverses a deviation from cylindricity of said component and adapted to store said deviation signals,
   (c) ancillary angle measuring means connected to said computer to provide electrical position signals to said computer for identifying a position where said deviation occurred,
   (d) said displacement transducer, said computer and said ancillary angle measuring means are portable to permit transportation to the rotary component, and
   (e) said displacement transducer and said ancillary angle measuring means are removably attachable to test stands and fixtures of different rotary components to facilitate runout measurement thereof.

2. The invention in claim 1 wherein said ancillary measuring means comprises
   (a) a magnetic member attached to said component at a predetermined 0° position on the periphery thereof,
   (b) an electrical magnetic pickup device connected to said computer and adjacent said magnetic member so that said magnetic member is caused to pass closely adjacent said pickup device upon rotation of said component,
   (c) said pickup device providing an electric reset signal to said computer on passage thereby of said magnetic member.

3. The invention as recited in claim 1 wherein said ancillary measuring means includes
   (a) encoder means associated therewith and electrically connected to said computer,
   (b) a rotary wheel member connected to said encoder and in rolling contact with the periphery of said component to cause said encoder to supply said electrical position signals to said computer.

4. The invention as recited in claim 1 wherein said ancillary measuring means is a non component contact means comprising in combination
   (a) a code band positioned circumferentially about said component, (b) said code band bearing exposed code indicia thereon each corresponding to an angular position of said component relative to a reference position, (c) an optical scanning device positioned adjacent said code band to generate a light beam projecting on said code band, (d) an electrical connection connecting said scanning device to said computer to transmit said electrical position signals from said scanning device to said computer corresponding to said code indicia on said code band.

5. The invention as recited in claim 4 wherein said code band comprises a flexible tape affixed to a circumference of said rotary component.

6. The invention as recited in claim 4 wherein said code band comprises a circumferential row of code indicia formed in the surface of said component.

7. The invention of claim 4, wherein said optical scanning device is a laser scanner.

8. The invention as recited in claim 1 wherein said ancillary measuring means comprises (a) a plurality of equally spaced marker means positioned in a circumferential row on the periphery of said component to be contacted by said transducer contact element, and (b) a separate manual electric signal means connected to said computer to supply said computer with an electrical start position signal when a predetermined one of said marker means is closely adjacent said contact element.

9. The invention as recited in claim 1 wherein said ancillary measuring means comprise a circumferential row of projecting markers on the periphery of said component to be measured and traversed by said transducer contact element, said projecting markers causing said contact element to move to cause said transducer to supply said electrical position signals to said computer.

10. The invention as recited in claim 9 wherein a separate manually operated signal means is connected to said computer and is operator operable to provide an alert signal to said computer prior to a start signal to said computer from said transducer caused by traversal of one of said projecting markers.

11. The invention as recited in claim 1 wherein said displacement transducer and said ancillary angle measuring means are magnetically attachable to test stands and fixtures of different rotary components.

12. A measuring system for measuring cylindricity of a rotary component mounted for rotation about its axis of rotation comprising in combination (a) a displacement transducer having a contact element thereon in contact with a circumference of said component to be measured, (b) a computer connected to said transducer to receive electrical deviation signals therefrom when said contact element traverses a deviation from cylindricity of said component and adapted to store said deviation signals, (c) a plurality of equally spaced marker means positioned in a circumferential row on the periphery of said component to be contacted by said transducer contact element to cause said transducer to send position signals to said computer, and (d) a separate manual electric signal means connected to said computer to supply said computer with an alert signal when a predetermined one of said marker means is approaching said contact element, said predetermined marker means representing a start position to begin a test.

13. A measuring system for measuring cylindricity of a rotary component mounted to rotation about its axis of rotation comprising in combination (a) a displacement transducer having a contact element thereon in contact with a circumference of said component to be measured, (b) a computer connected to said transducer to receive electrical deviation signals therefrom when said contact element traverses a deviation from cylindricity of said component and adapted to store said deviation signals, and (c) a circumferential row of projecting markers on the periphery of said component to be measured and traversed by said transducer contact element so that said projecting markers move said contact element to cause said transducer to supply position signals to said computer.

14. The invention as recited in claim 13 wherein a separate manually operated signal means is connected to said computer and is operator operable to provide an alert signal to said computer prior to a start signal to said computer from said transducer caused by traversal of a selected one of said projecting markers.

* * * * *